United States Patent [19]

Wang

[11] Patent Number: 5,569,918
[45] Date of Patent: Oct. 29, 1996

[54] PROBE HOLDER AND PROBE MOUNTING METHOD FOR A SCANNING PROBE MICROSCOPE

[75] Inventor: Zhouhang Wang, Pontiac, Mich.

[73] Assignee: RHK Technology, Inc., Rochester Hills, Mich.

[21] Appl. No.: 406,296

[22] Filed: Mar. 17, 1995

[51] Int. Cl.$^6$ .............................. H01J 37/28; H01J 37/20
[52] U.S. Cl. ................................ 250/306; 250/442.11
[58] Field of Search ............................ 250/306, 442.11

[56] References Cited

U.S. PATENT DOCUMENTS

| | | | |
|---|---|---|---|
| 4,785,177 | 11/1988 | Besocke | 250/442.11 |
| 4,871,938 | 10/1989 | Elings et al. | 310/328 |
| 4,947,042 | 8/1990 | Nishioka et al. | 250/442.11 |
| 4,992,660 | 2/1991 | Kobayashi | 250/306 |
| 5,157,256 | 10/1992 | Aaron | 250/306 |
| 5,325,010 | 6/1994 | Besocke et al. | 310/317 |

Primary Examiner—Jack I. Berman
Attorney, Agent, or Firm—Young and Basile, P.C.

[57] ABSTRACT

A probe holder non-rotatingly mountable in a support bracket releasibly receives a scanning microscope probe. Guide rods extend outward from the probe holder on the scan head and engage bores formed in the other of the probe holder and the scan head during closure of the scan head with the probe holder to co-axially align the probe with a probe receiver in the scan head. Transversely extending arms on a spindle attached to a scan head slide along ramp surfaces in the scan head to a fixed stop to rotationally position the scan head. Complementary surfaces on the spindle and a stationarily affixed sleeve co-axially center the scan head with the scan head support structure and the probe holder. A method of co-axially and rotationally aligning a probe for exchange between a scan head and a probe holder is disclosed using the guide rods and guide bores, the spindle arms, ramp and stop surfaces and the complementary surfaces on the spindle and the stationary sleeve, and a non-rotatable probe holder mount. The alignment structure and method are also applied to a sample holder.

51 Claims, 6 Drawing Sheets

PROBE HOLDER AND PROBE MOUNTING METHOD FOR A SCANNING PROBE MICROSCOPE

BACKGROUND OF THE INVENTION

1. Field of the Invention

The present invention relates, in general, to scanning probe microscopes and, in particular, to probes for scanning probe microscopes.

2. Background Description

A scanning probe microscope, such as a scanning tunnelling microscope, positions a conducting tip or probe extremely close, such as ten angstroms, to the surface of a conducting sample. A voltage applied between the probe and the sample causes a current referred to as a tunnelling current to flow between the sample and tip.

Such microscopes include a positioning device to control the X-Y-Z scan of the probe or tip over the surface of the sample. As disclosed in U.S. Pat. Nos. 4,785,177; 4,871,938 and 5,325,010, a plurality of tubular, piezoelectric electrodes are mounted on the scanning head and engage the surface of the sample, typically by a ball mounted on the end of each electrode. The scanning tip or probe is mounted in another piezoelectric electrode and held at a constant separation distance from the surface of the sample. The application of electric voltage to the electrodes causes deformation of the piezoelectric electrodes thereby providing a precise X-Y-Z control of the position of the scanning head and tip relative to the surface of the sample.

Despite the close separation distance of approximately ten angstroms between the probe and the surface of the sample, it is imperative that the probe remain separated from the sample. Any contact of the probe and the sample generally will damage the probe sufficiently to render it inoperative. As a result, it becomes frequently necessary to replace the probe in a scanning probe microscope. At best, this is a difficult procedure particularly when the microscope is mounted in a vacuum chamber. A remote manipulator extending into the chamber may be required to remove the probe from the scan head and to mount a new probe therein. The close arrangement of components within the vacuum chamber and the extremely small size of the probe make axial alignment of the probe with the probe holder in the scan head extremely difficult.

Further, it is important to provide the proper length when mounting a new probe in the scan head as probe length must be within the coarse approach range of the scan head. While certain of these difficulties can be eliminated by opening the microscope chamber, such is not desirable since it usually requires at least two days to reattain the desired vacuum level.

Another problem encountered in the use of scanning probe microscopes involves the repeatable mounting of the sample relative to the probe. Frequently, the sample is mounted in a holder which is inserted into an open-ended, U-shaped slot in a guide bracket mounted on a support base. The slot in the guide bracket limits the insertion distance of the sample holder into the guide bracket; but still enables the sample holder to be freely rotated. This makes it extremely difficult, if not impossible to obtain the same probe position on consecutive measurements on the same sample after removing and reinserting the sample in the microscope. Such sample guides are not precise enough to enable removal and insertion of a sample into the same scan spot.

Thus, it would be desirable to provide a probe holder for a scanning probe microscope which provides accurate alignment of a replacement probe with a probe holder in the microscope scan head. It would also be desirable to provide such a probe holder which can utilize the same manipulator used to mount the sample in the microscope chamber. It would also be desirable to provide a probe holder for a scanning probe microscope which provides quick and easy replacement of a probe in the scan head. It would also be desirable to provide a probe holder which is self-aligning during probe replacement. It would be desirable to provide a scanning probe microscope with an alignment mechanism which provides repeatable, accurate positioning of the probe holder with respect to the probe mounting socket in the scan head. It would also be desirable to provide an alignment device for repeatable, accurate positioning of a sample holder with a scan head.

SUMMARY OF THE INVENTION

The present invention is a probe holder and probe mounting method for a scanning probe microscope which assures accurate co-axial alignment of a replacement probe with a scan head and enables easy and quick exchange of a probe in the scan head.

A probe holder means is mounted on a sample mounting base for releasibly holding a probe. The scan head and the probe holder means are mounted for movement relative to each other to permit exchange of a probe between the scan head and the probe holder means. This permits a worn or damaged tip to be easily removed from a scan head and a new probe accurately and easily inserted into the scan head. In a preferred embodiment, the scan head is mounted for bidirectional coarse movement relative to a stationarily fixed probe holder means mounted on the sample support base.

A scan head support means includes a stationarily mounted tubular sleeve having a radially outward flared conical end. Means are mounted over the tubular sleeve and connected to the scan head for bi-directionally moving the scan head relative to the spaced probe holder means. The scan head has a centrally located spindle projecting outwardly therefrom. The spindle has an outer end surface complementary to the conical end of the sleeve to engage and center the spindle within the conical end of the tubular sleeve.

Means are provided for co-axially and rotationally aligning the probe holder means with the scan head. The alignment means preferably comprises at least one guide bore formed in one of the scan head and the probe holder means and at least one guide rod mounted on and extending outward from the other of the scan head and the probe holder means. The guide rod slidably engages the guide bore as the scan head and probe holder means are moved toward each other to co-axially align the scan head with the probe holder means. Preferably, a plurality of circumferentially spaced bores and a plurality of circumferentially spaced guide rods are provided.

In an alternate embodiment, the guide bore or bores include an enlarged diameter end portion and a smaller diameter inner portion. The mating guide rod or rods has a smaller diameter end portion and an enlarged diameter portion adjacent to the end portion, each respectively engageable with the inner and end portions of the mating guide bore.

Further, a first set of guide rods may be provided for engagement with a first set of guide bores. At least one and, preferably, a plurality of additional guide rods having a length longer than the set of first guide rods and a diameter different than the first guide rods are engageable with a corresponding formed additional bores before the first set of guide rods engage the first guide bores.

The latter two embodiments of the guide rods and guide bores provide more precise alignment of the probe holder means and the scan head.

Preferably, the probe holder means comprises a body and means mounted on the body for non-rotatably mounting the body in an open-ended slot formed in a sample mounting bracket mounted on a support base. This assures repeatable, accurate, co-axial and angular positioning of the probe holder means relative to the scan head.

The probe holder means further comprises a body having probe transfer member mounted in the body and releasibly receiving a probe therein. Means are mounted on the body for resiliently mounting or supporting the probe transfer member on the body.

Means are further provided for releasibly locking the probe in the probe transfer member. Preferably, the locking means comprises a spring wire fixed at one end and extending through a notch formed in the probe. The spring wire is movable between a first position locking the probe in the probe transfer holder and a second spaced position disengaged from the notch in the probe to enable releasable pickup of the probe by the scan head.

A method for replacing a probe in a scanning probe microscope is also disclosed. The method comprises the steps of:

mounting a probe holder means in a support;

effecting relative movement of a scan head and the probe holder means toward each other to exchange the probe in a probe socket in the scan head and to retain the probe in the scan head after the scan head is separated from the probe holder means;

co-axially aligning the scan head and the probe holder.

Preferably, the aligning step comprises forming a stationarily positioned tubular sleeve having an outwardly flared conical end and attaching a scan head support to the tubular sleeve. This embodiment of the present method further includes the step of forming an axially extending spindle on the scan head having an end surface complementary to the conical end of the tubular sleeve to axially center the spindle and the attached scan head in the tubular sleeve when the scan head is disengaged from the probe holder means.

The method further comprises the step of forming at least one opening having a surrounding ramp surface and a stop surface in the scan head support. At least one transversely extending arm is formed on the spindle, the arm slides along the ramp surface into engagement with the stop surface when the head and the probe holder are separated to rotate the scan head to an alignment position with the probe holder.

The step of aligning further comprises the steps of forming at least one and, preferably, a plurality of circumferentially spaced bores in one of the scan head and the probe holder means and mounting a plurality of circumferentially spaced guide rods in the other of the scan head and the probe holder means such that the guide rods engage the bores when the scan head and probe holder are moved toward each other to co-axially align the scan head and the probe holder means.

The aligning step further comprises the step of forming the probe holder means with a body with an end portion which non-rotatingly engages a sample mounting support. Preferably, the end portion is formed as a plate attached to the probe holder body and having non-arcuate side walls preventing rotation of the probe holder in the sample mounting support.

The above-described alignment structure and method may also be applied to a sample holder to accurately and repeatedly position the sample holder in a set position relative to the scan head to enable consecutive measurement on the sample after the sample is removed from and reinserted into the microscope chamber.

The probe holder and probe mounting method of the present invention simplifies the replacement of a probe in the scan head of a scanning probe microscope. The probe holder provides a unique means removing a worn or damaged probe from the scan head and for accurately mounting a new probe in the scan head. The probe holder itself is accurately inserted into a sample guide support bracket mounted on a base within the microscope chamber in a non-rotatable manner to ensure repeatable, accurate, co-axial and rotational alignment of the probe holder with the probe receiver or socket in the scan head.

Further, the scan head itself is provided with a unique spindle arm which engages a ramp and a stop structure to ensure that the scan head is rotatably positioned in a set rotational position when separated from the probe holder. The spindle on the scan head is provided with an end surface shaped complementary to a conical surface formed on a stationary sleeve in the scan head support structure to axially center the scan head relative to the sleeve and the probe holder.

Finally, the use of guide rods which engage guide bores aligns the probe holder with the scan head to ensure accurate co-axial alignment of the probe receiver or socket in the scan head and the probe transfer member in the probe holder.

These alignment steps enable a replacement probe to be quickly, easily and accurately mounted in a scan head without any difficulty or damage to the probe

BRIEF DESCRIPTION OF THE DRAWING

The various features and advantages of the present invention will become more apparent by referring to the following detailed description and drawing in which.

DESCRIPTION OF THE PREFERRED EMBODIMENTS

Figure 2:
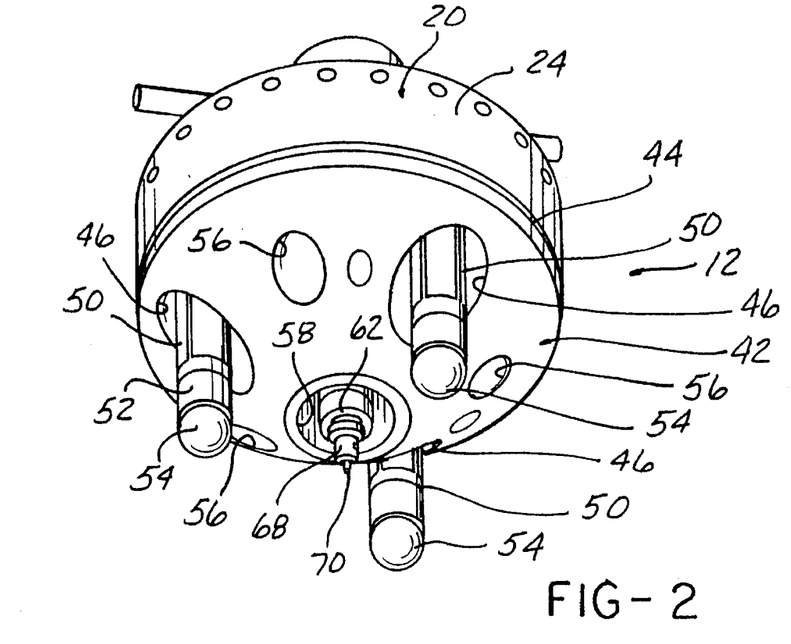
FIG. 2 is an enlarged, perspective view of the scan head of the scanning probe microscope shown in FIG. 1.
Figure 3:
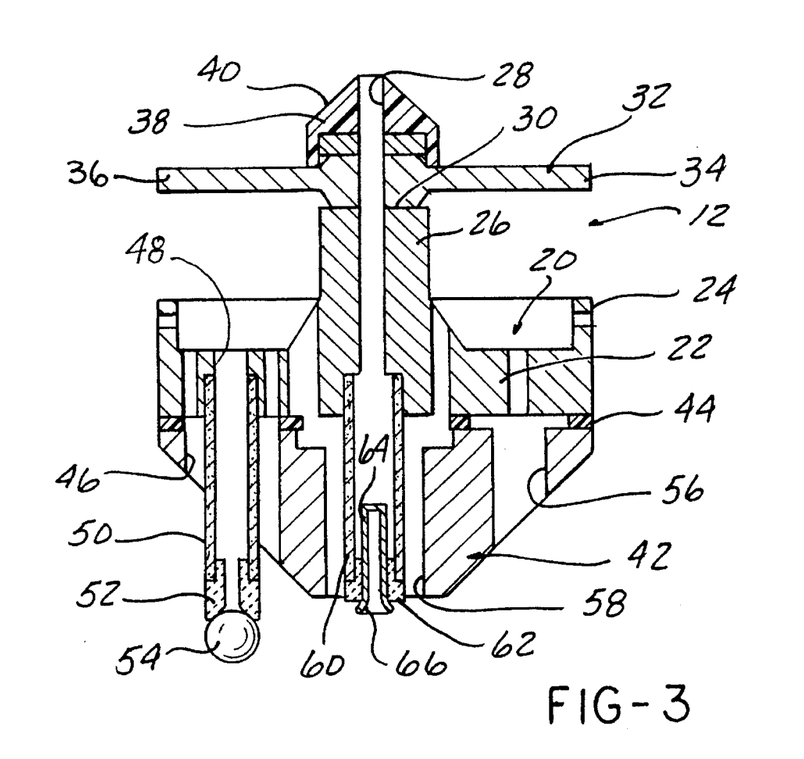
FIG. 3 is a lateral cross sectional view through the scan head shown in FIG. 2.

Referring now to the drawing, and to FIGS. 1, 2 and 3 in particular, there is depicted a scanning probe microscope 10 which, by way of example only, is illustrated and will be described hereafter as being in the form of a scanning tunnelling microscope. The microscope 10 includes a scan head 12 which is movably adjusted by an adjustment mechanism 14 along the Z axis relative to a sample support surface or base 16.

The scan head 12 includes a body 20 having a planar base 22 and an upstanding, peripheral edge flange 24. A spindle 26 is integrally formed with and extends centrally outward from the base 22. A longitudinally extending bore 28 extends through the spindle 26. A transverse bore 30 extends through one end of the spindle 26 and receives a sprocket 32 therein. The sprocket 32 has opposed end arms 34 and 36 projecting outwardly from the spindle 26. An end cap 38 having an outer conical-shaped surface 40 is mounted on one end of the spindle 26. The through bore 28 extends through the end cap 38 as shown in FIG. 3.

A cone-shaped adapter 42 is attached to the base 22 of the body 20 by means of suitable fasteners extending through bores formed in the adapter 42 and the body 20. A washer 44 is interposed between mating surfaces of the adapter 42 and the body 20. A plurality of circumferentially spaced, peripherally arranged bores 46 extend through the adapter 42 and communicate with aligned bores 48 in the body 20 as shown in FIG. 3. The bores 46 and 48, which are exemplary depicted as comprising three circumferentially spaced bores 46 and 48, each receive a tubular piezoelectric electrode 50. An adapter 52 is mounted at one end of the piezoelectric electrode 50 and fixedly receives a ball 54 which contacts the surface of a sample holder in a conventional manner during movement of the scan head over the surface of a sample.

An additional set of through bores 56 are also formed in the adapter 42. By way of example only, three bores 56 are shown in FIG. 2, with each bore 56 interposed between a pair of the bores 46. The purpose of the bores 56 will be described in greater detail hereafter.

A central bore 58 is formed in the adapter 42 and is co-axially aligned with the through bore 28 extending through the spindle 26. A piezoelectric element or electrode 60 extends through the bore 58 and is fixedly mounted at one end in the base 22 of the body 20 as shown in FIG. 3. An insulated spacer 62 is mounted in one end of the piezoelectric electrode 60 and supports an electrically conductive socket 64. The socket 64 has a radially outward flared conical-shape end 66, as shown in FIG. 3, which is sized to snugly receive a probe 68 having a wire tip 70 therein as shown in FIG. 2 and in greater detail in FIG. 7.

Figure 1:
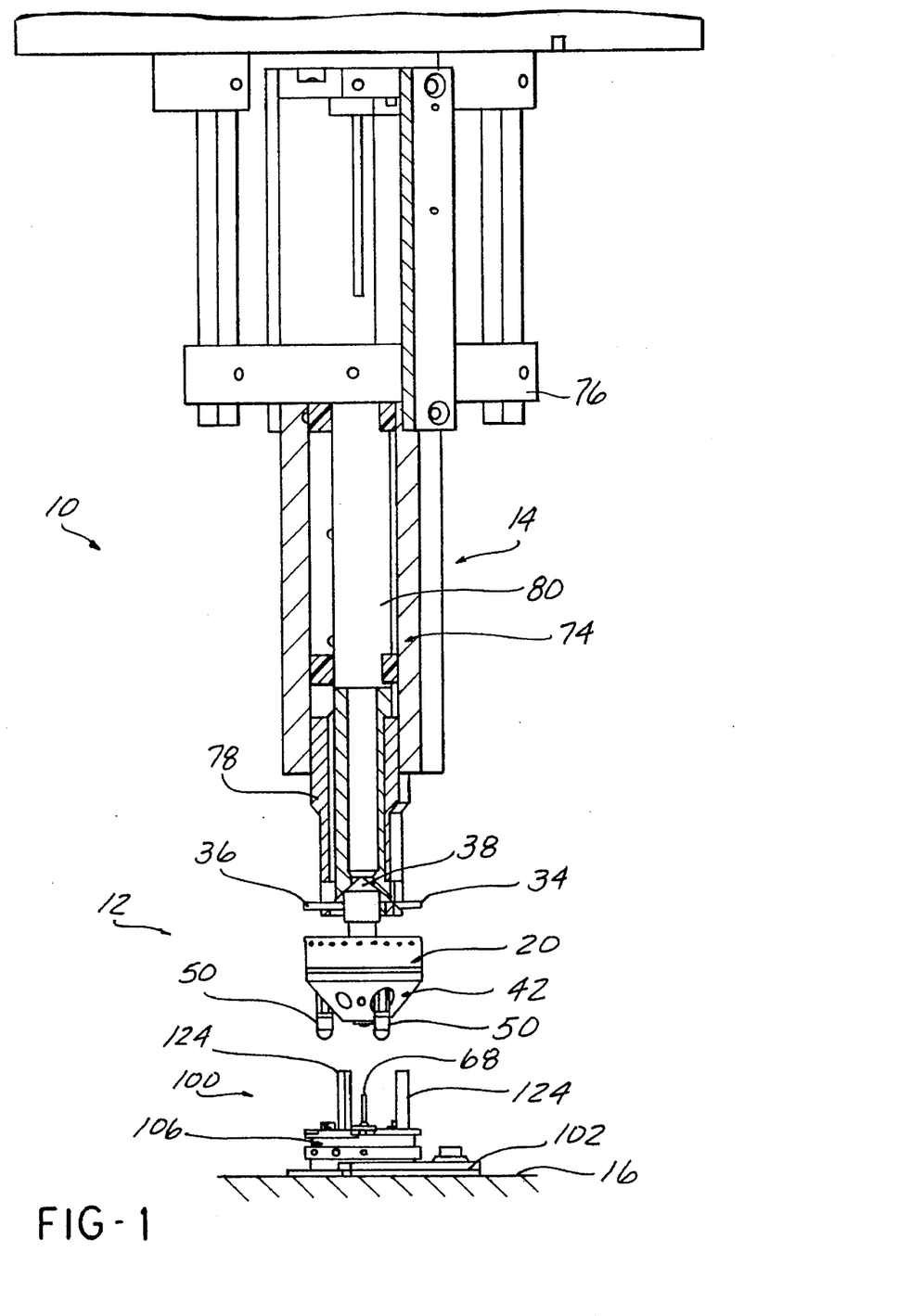
FIG. 1 is a partially cross sectioned, side elevational view of a scanning probe microscope and a probe holder constructed in accordance of the teachings of the present invention.
Figure 6:
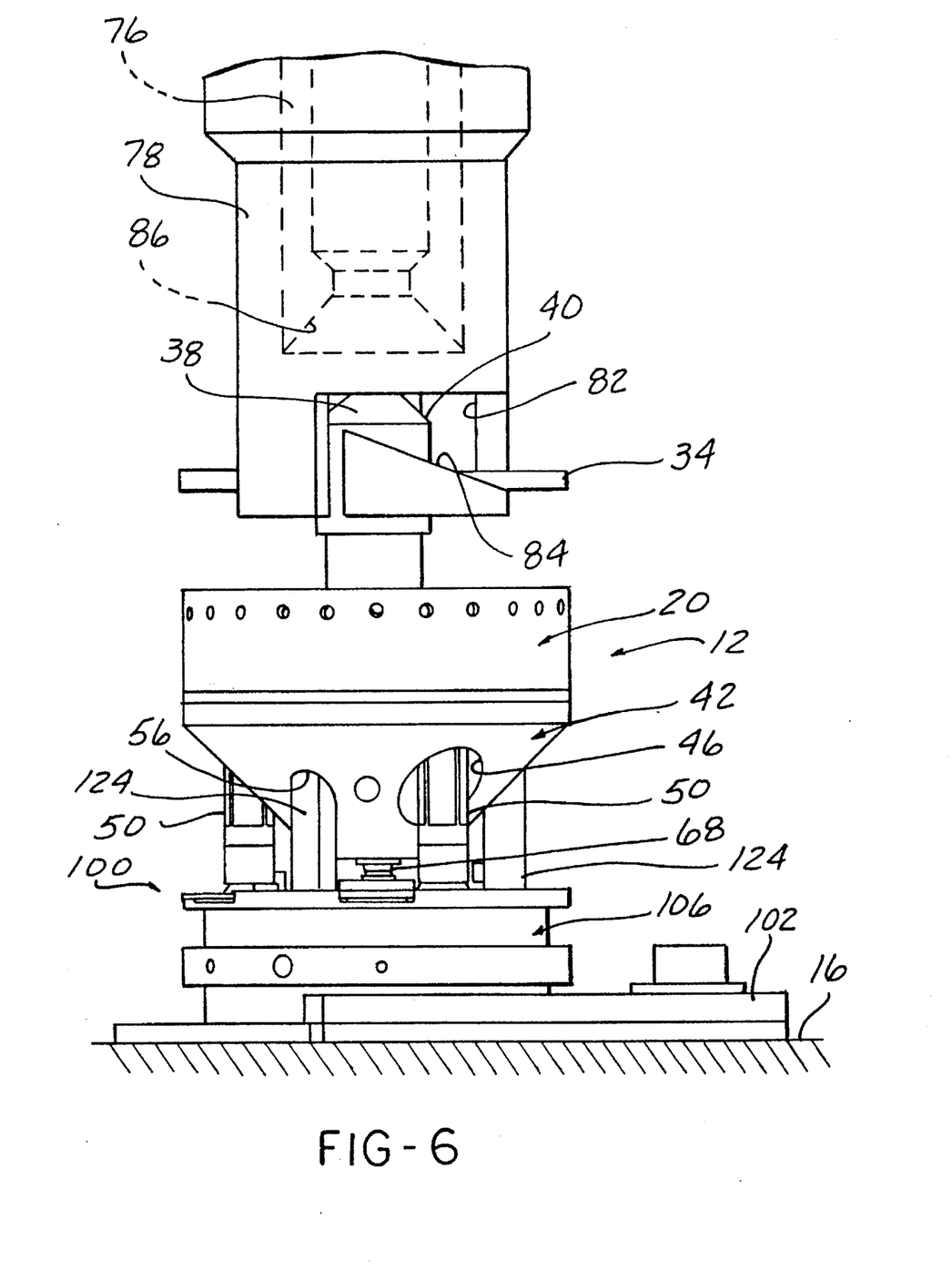
FIG. 6 is a side elevational view showing the engagement of the scan head with the probe holder of the present invention.

Referring now to FIGS. 1 and 6, the scan head 12 is supported in and adjustable along an axis, such as the Z axis in the vertical orientation shown by way of example only in FIG. 1, by means of suitable support and adjustment structure. A movable tubular member 74 extends through a fixed support 76 and has a sleeve 78 fixedly mounted in one end and extending outward from the one end. A stationary, central tubular member 80 is fixedly mounted to the support 76 and extends through the sleeve 74. The sleeve 78, as shown in greater detail in FIG. 6, has at least one and preferably a pair of diametrically opposed openings 82. The spindle arms 34 and 36 extend through the opposed openings 82 and ride along and down ramp surfaces 84 formed along one edge of each opening 82 to a lower edge of the opening 82 as the sleeve 78 retards away from a probe holder 100. This places the scan head 12 in a specific rotational position. Further, when the ball 54 on the electrodes contact the sample holder, the spindle arms 34 and 36 freely move within the opening 82 to decouple vibrations from the scan head 12.

According to the present invention, the scan head 12 also includes means for co-axially aligning the socket 64 with the probe holder 100. Such alignment means includes a conical surface 86 at one end of the tubular member 80 which mates with the conical surface 40 on the end cap 38 attached to the spindle 26.

In the position shown in FIG. 6, during the initial movement of the sleeve 78 away from the sample support surface or base 16, the spindle arms 34 and 36 will slide downwardly along the ramp surfaces 84 to a bottom corner of each respective opening 82. This fixes the scan head 12 in a set rotational position. Further, as the end cap 38 of the spindle 26 approaches the stationary tubular member 80, the conical surface 40 on the end cap 38 of the spindle 26 engages the conical end surface 86 on the sleeve 80 thereby axially aligning the scan head 12 with respect to the longitudinal axis of the sleeve 80. This provides repeatable, highly precise positioning of the scan head 12 relative to the probe holder 100 mounted on the support base 16.

Figure 4:
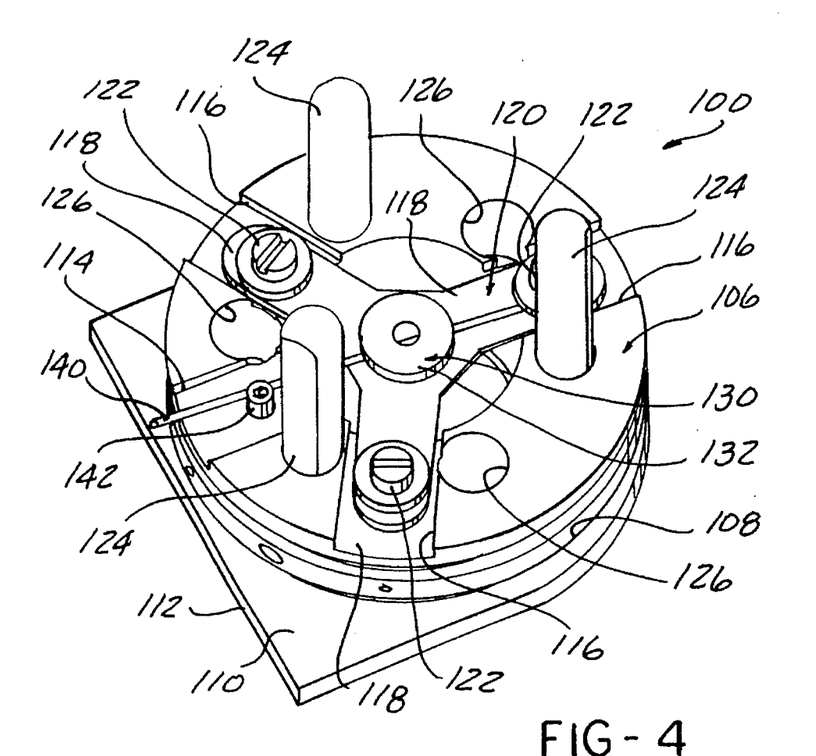
FIG. 4 is an enlarged, perspective view of the probe holder shown in FIG. 1.
Figure 5:
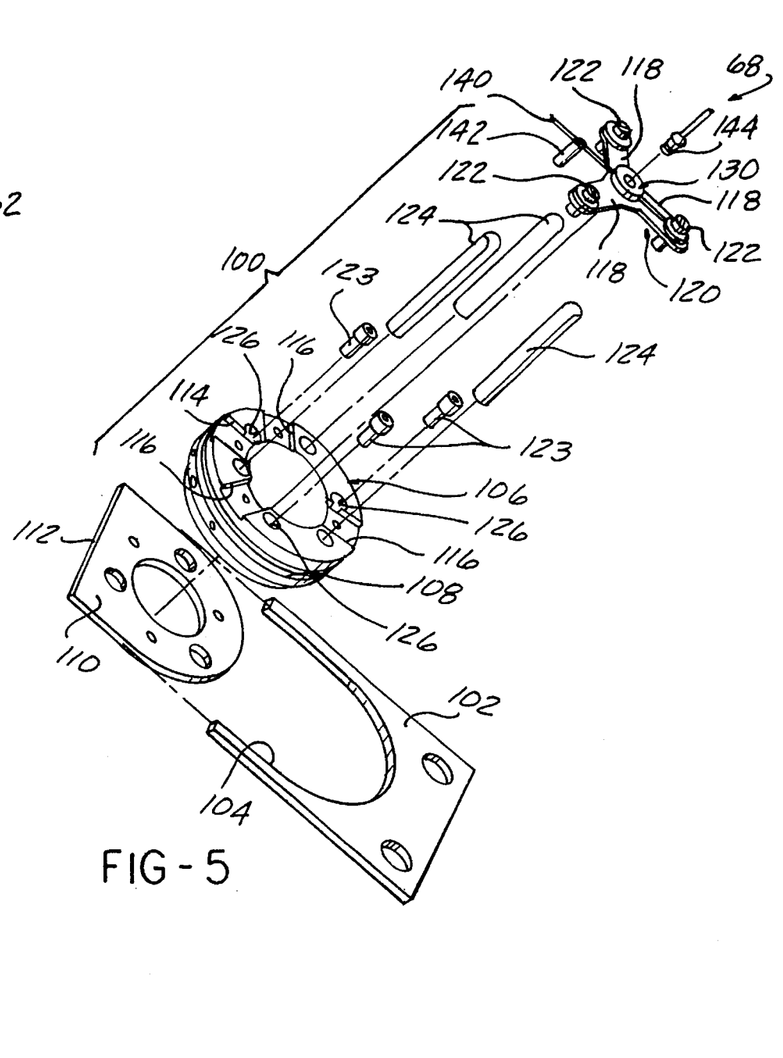
FIG. 5 is an exploded, perspective view of the probe holder shown in FIG. 4.

Referring now to FIG. 1, and to FIGS. 4 and 5 in particular, there is depicted a probe or tip holder 100. As shown in FIGS. 1 and 5, the probe holder 100 is slidingly mountable in a guide support bracket 102 which is fixedly mounted on the support base 16. The guide support bracket 102 includes an open-ended, generally U-shaped slot 104, by way of example. Other mounting arrangements are also possible.

The probe holder 100 includes a body 106 preferably having a circular shape with a diameter to snugly fit within the slot 104 in the guide support bracket 102. At least one annular groove 108 is formed on the side wall of the body 106 for engagement with a remote manipulator in a conventional manner to insert and/or remove the probe holder 106 into or from the guide support bracket 102.

A base 110 is attached by means of suitable fasteners 123 to the bottom surface of the body 106. The base 110 is generally planar in shape and has a width sized to snugly fit within the width of the slot 104 in the guide support bracket 102. However, as shown in FIGS. 4 and 5, while one end of the base 110 is rounded to snugly engage the arcuate-shaped end of the slot 104 in the guide support bracket 102, the sides and opposite end 112 is squared off. This prevents rotation of the base 110 within the slot 104 to thereby precisely mount the probe holder 100 in a repeatable specific position within the guide support bracket 102 to align the guide rods in the probe holder 100, as described hereafter, with the guide bores 56 in the scan head 12.

A first slot 114 is formed in the top surface of the body 106. The slot 114 receives a lock means as described hereafter. In addition, three circumferentially spaced slots 116 are also formed in the top surface of the body 106. Each slot 106 receives one of three circumferentially spaced legs 118 of a resilient spring means denoted generally by reference number 120. The spring 120 is formed of a resilient material to provide a resilient movement when the scan head 12 engages the probe 68 mounted in the spring 120 as described hereafter. Fasteners 122 extend through each of the legs 118 and engage threaded bores formed in the body 106 within each of the slots 116 to securely attach the spring 120 to the body 106.

A plurality, such as three by way of example only, of guide posts or rods 124 are fixedly mounted in circumferentially spaced bores in the body 106. The guide rods 124 extend outwardly from the top surface of the body 106 and have a diameter sized to closely engage the bores 56 formed in the adapter 42 to guide and align the probe holder 106 with the scan head 12 during pickup of the probe 68 from the probe holder 106. An additional set of bores 126 is also formed in and extends through the body 106. The bores 126 are sized to receive the ball 54 and the end of each piezoelectric electrode 50 during exchange of the probe 68 between the probe holder 100 and the scan head 12 as shown in FIG. 7 and described hereafter.

The above description of the guide posts 124 in the probe holder 100 and the guide bores 56 in the adapter 42 will be understood by way of example only. Alternately, the guide posts 124 could be mounted in the adapter 42 and the guide bores 56 formed in the body 106 of the probe holder 100.

Figure 7:
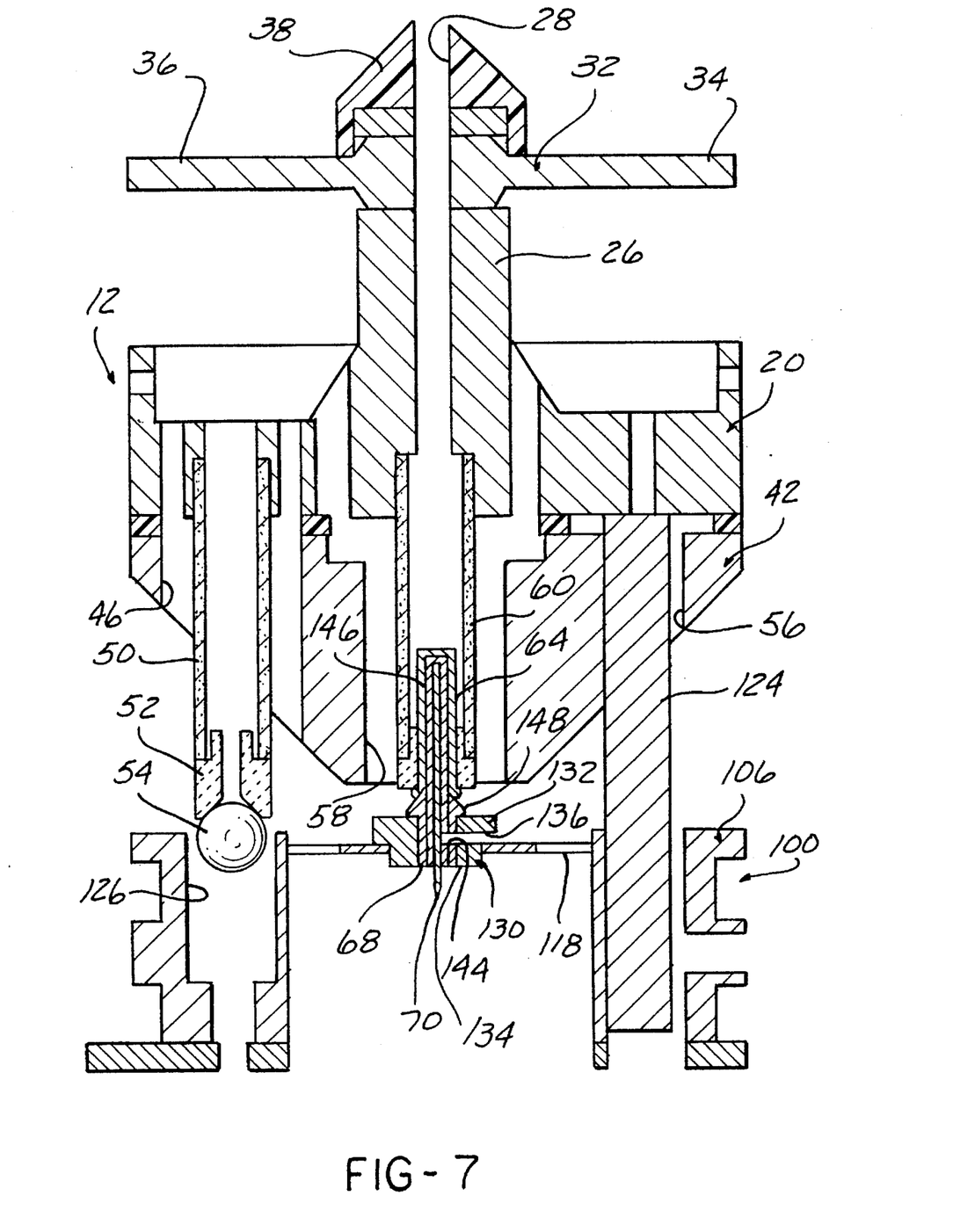
FIG. 7 is a cross sectional view taken laterally through FIG. 6.

A probe transfer holder 130 is mounted in a central aperture formed in the spring 120 as shown in FIGS. 4, 5 and in greater detail in FIG. 7. The probe transfer holder 130 has an enlarged diameter upper portion 132 which overlies the top surface of the spring 120. A smaller diameter opposed end portion 134 is sized to fit through the central aperture in the spring 120. A notch 136, shown in FIG. 7, is formed between the upper and opposed end portions 132 and 134 and extends partially through the diameter of the probe transfer holder 130. The notch 136 provides a passage for the lock means which, in a preferred embodiment, is in the form of a resilient spring wire 140. The spring wire 140 is secured at one end to one of the fasteners 122 used to attach the spring 120 to the body 106. An intermediate portion of the spring wire 140 extends through the notch 136 to an opposite end which passes through the slot 114 in the body 106. A stop bar 142 is mounted in a bore in the body 106 within the slot 114.

The spring wire 140 passes through the notch 136 in the transfer holder 130 and also through a similarly formed notch 144 formed in the probe 68 as shown in FIG. 7. The spring wire 140 is moved from a first position within the notches 136 and 144 to lockingly retain the probe 68 within the probe transfer holder 130. Movement of the spring wire 140 to a second position moves the spring wire outwardly from the notch 144 in the probe 68 thereby allowing disengagement of the probe 68 from the probe transfer holder 130.

As shown in FIGS. 5 and 7, the probe 68 has a generally elongated, cylindrical form with a hollow bore extending therethrough sized to receive a sleeve 146 and the wire 70. An intermediate portion of the probe 68 is formed with an outwardly radially extending conical surface 148 which snugly engages the conical surface 66 in the socket 64 mounted in the socket 64 of the scan head 12 to ensure precise alignment of the probe 68 with the socket 64.

When it becomes necessary to replace a worn or damaged tip 70 in a probe 68 mounted in the scan head 12, the scan head 12 is separated from the sample holder. During such separation, as described above, the spindle arms 34 and 36 slide along the ramp surfaces 86 in the opening 82 of the sleeve 78 to a lower edge thereof to set a specified rotational position of the scan head relative to the longitudinal axis of the scan head 12. On further movement of the sleeve 78, the conical surface 40 on the end cap 38 engages the mating conical surface 86 in the sleeve 76 thereby co-axially centering the spindle 26 and the scan head 12 attached thereto with a longitudinal axis extending through the sleeve 78. This co-axial alignment and rotational position of the scan head 12 in conjunction with the non-rotatably mounted probe holder 100 ensures that the guide rods 124 are aligned with the guide bores 56 for engagement.

Next, a probe holder 100 which does not carry a probe 68 is inserted into the bracket 102. Due to the squared off sides and end wall of the base 110, the probe holder 100 is rotationally positioned in the support bracket 102 with the scan head 12.

Next, the scan head 12 and the probe holder 100 are moved toward each other, such as by advancing the scan head 12 toward the stationary probe holder 10 in the exemplary embodiment of the present invention. The guide rods 124 slidingly engage the bores 56 in the scan head 12 to precisely align the probe 68 mounted in the scan head 12 with the bore in the probe transfer member 130 in the probe holder 100. The scan head 12 will be advanced sufficiently to slide one end of the probe 68 into the probe transfer holder 130. The resiliency of the spring 120 ensures a snug engagement of the probe 68 in the probe transfer holder 100 sufficient to retain the probe 68 in the probe transfer holder 100 after the scan head 12 is subsequently separated from the probe holder 100.

When the scan head 12 is fully engaged with respect to the probe holder 100, the lock member or spring wire 140 is then moved to the lock position engaging the notch 144 in the probe 68 to securely lock the probe 68 in the probe transfer holder 130.

The probe holder 100 carrying the worn or damaged probe 68 is then removed from the microscope chamber and the probe 68 removed from the probe transfer holder 130. A new probe 68 is then mounted in the probe transfer holder 130 on the body 106 by moving the spring wire 140 to the second position enabling the probe 68 to be inserted into the central aperture in the probe transfer holder 130. The spring wire 140 is then moved back to the first position engaging the notch 144 in the probe 68 to securely retain the probe 68 in the body 106.

The probe holder 100 is then mounted in the guide support bracket 102 as shown in FIGS. 1 and 5 by sliding the base 110 into the slot 104 in the guide support bracket 102 until one end of the base 110 securely engages the arcuate end of the slot 104.

The scan head 12 is then lowered, in the vertical head orientation shown in FIGS. 1, 6, and 7 until the guide posts 124 engage the bores 56 in the adapter 42 of the scan head 12. This ensures co-axial alignment of the probe holder 68 with the corresponding probe socket 64 in the piezoelectric element 62 in the body 20.

During such relative movement, the ball 54 on each piezoelectric electrode 50 freely extends into one of the bores 126 in the body 106 to allow displacement of the scan head 12 relative to the body 106.

Further, during such engagement of the guide posts 124 with the bores 56 in the adapter 42, the end of the probe 68 will slide through the aperture in the socket 64 mounted on the end of the sleeve 60 in the adapter 42 and engage the socket 64 in a press fit to securely retain the probe holder 68 and the probe or tip 70 mounted therein within the socket 64. The resiliency of the spring 120 allows the scan head 12 to be lowered sufficiently to securely engage the probe holder 68.

After the probe holder 68 is securely mounted in the socket 64 in the body 20, the remote manipulator is used to move the spring wire 140 to the second position disengaging the spring wire 140 from notch 144 in the probe 68. The scan head 12 and the probe holder 100 may then be moved apart from each other, such as by retracting the scan head 12 from the stationary probe holder 100 in the preferred embodiment of the present invention. Since the probe 68 is now securely mounted within the socket 64, such disengagement causes the probe 68 to decouple from the probe transfer holder 130 and be securely mounted in the scan head 12.

Figure 8:
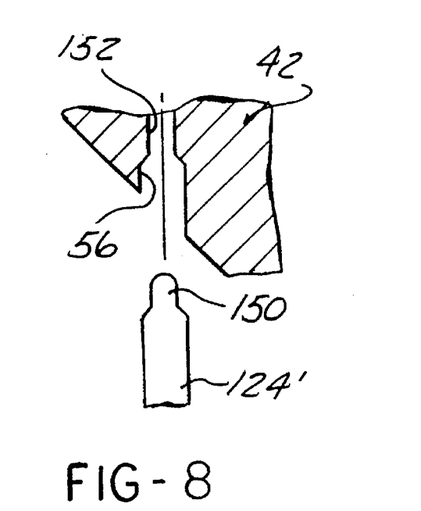
FIG. 8 is a partial, cross sectional view showing an alternate embodiment of the probe holder guide rods in a guide bore in the scan head.

FIG. 8 depicts an alternate embodiment of the guide posts 124. As shown in FIG. 8, a guide post 124' has a reduced diameter end portion 150 of a short length. The corresponding bore 56 in the adapter 42 has a first end portion with a diameter sized to securely receive the enlarged diameter of the main extent of guide post 124'. A smaller, second diameter bore 152 extends from the first end portion of the bore 56 and is sized to securely receive the reduced diameter end 150 of the guide post 124'. This arrangement provides an initial loose alignment between the guide post 124' and the guide bore 56 in the adapter 42 when the large diameter of the guide post 124" first engages the first end of the bore 56, with a more precise alignment provided by subsequent engagement of the smaller diameters of the end portion 150 of the guide post 124' and the second end portion 152 of the bore 56.

Figure 9:
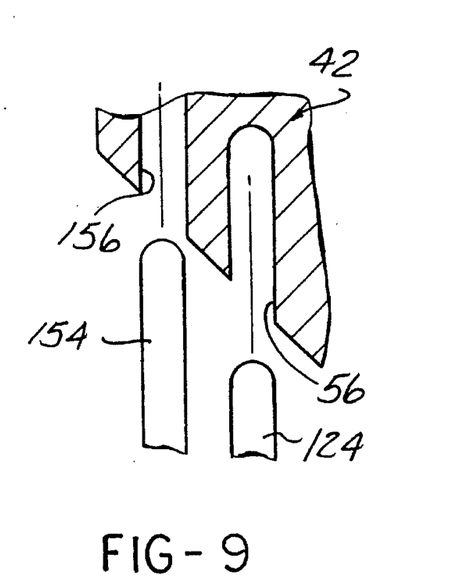
FIG. 9 is a partial, cross sectional view showing another embodiment of the probe holder guide rods and guide bores in the scan head.

In FIG. 9, another embodiment of the guide post and guide rod is depicted. In this embodiment, the guide post 124 engages a guide bore 56 in the adapter 42 as described above. However, an additional guide post or posts 154 are circumferentially interposed with the guide posts 124 on the probe holder 100 and have a diameter different than the diameter of the guide posts 124. By way of example only, the guide post or posts 154 have a larger diameter than the diameter of the guide posts 124. Further, the guide posts 154 have a longer length than the guide posts 124 so as to engage a corresponding sized bore 156 in the adapter 42 before the guide post 124 engage the mating guide bores 56. This two stage alignment provides an initial coarse alignment of the guide posts 154 with the guide bores 156 and then a more precise engagement of the more precisely matched smaller diameter guide posts 124 and the corresponding guide bores 56.

Figure 10:
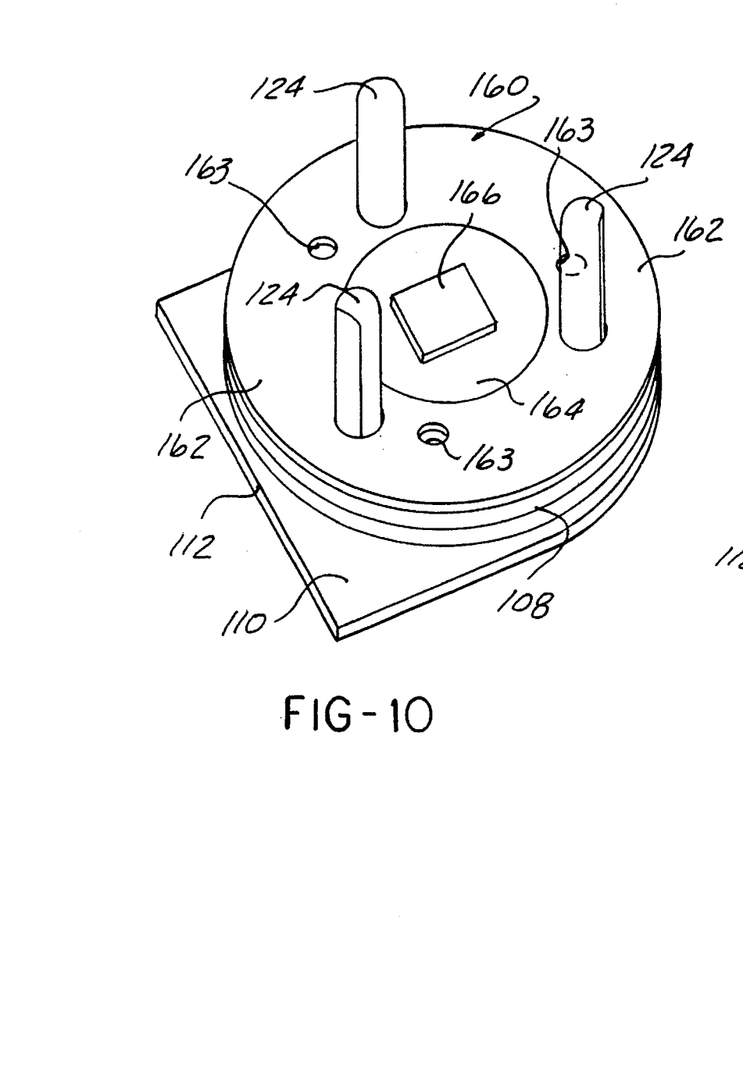
FIG. 10 is a perspective view of a sample holder utilizing the guide rods of the present invention.

Referring now to FIG. 10, there is depicted the use of the above-described guide rods 124 and the base 110 with a sample support 160. The sample support 160 has a generally cylindrical shaped body 162 with a centrally located support 164 for mounting a suitable sample 166 for scanning by the scan head 12. A peripheral groove 108 is formed on the side wall of the body 162 for engagement with a remote manipulator in a conventional manner.

The base 110 is secured to a bottom surface of the body 162 by means of fasteners, not shown, which extend through bores 163 formed in the body 162. As described above, the base 110 has squared off side walls and an end wall 112 to prevent rotation of the sample holder 160 when the sample holder 160 is inserted into the support bracket 102.

While the guide posts 124 can engage the bores 56 in the scan head 12, in the same manner as described above, an opposite mounting arrangement in which the bores 56 are formed in the body 162 of the sample holder 160 and the guide post 124 are formed in the adapter 42 may also be utilized.

The use of the non-rotatable base 110 and the alignment guide post 124 and guide bores 56 on the sample holder 160 provides precise repeatable positioning of the sample 166 mounted on the sample holder 160 with respect to the probe 68 in the scan head 12. This alignment is made more precise by the provision of the spindle arms 34 and 36 which engage the edge of the window 82 in the sleeve 78, and the provision of the mating conical surfaces 40 and 86, as described above, which rotate the scan head 12 to a set rotational position and co-axially align the scan head 12 with the longitudinal axis of the sleeve 76 and with the sample. This assures precise alignment of the guide post 124 and the guide bores 56 when the scan head 12 and the sample holder 160 are relatively moved toward each other.

In summary, the present invention provides a unique probe holder which simplifies the replacement of probes in a scanning probe microscope. The present scan head design and probe holder provides three distinct alignment stages or structure to ensure repeatably accurate, co-axial alignment of the probe in the probe holder with the respective probe receiver or socket in the scan head. First, the probe holder is precisely mounted in a guide support bracket to co-axially and non-rotatingly align the probe mounted therein with the probe receiver in the scan head. Secondly, the ramp and spindle arrangement in the scan head support sleeve and the scan head as well as the mating, complementary-shape surfaces on the scan head spindle and the stationary support sleeve ensure a repeatable, fixed rotational position and a co-axial centering of the scan head relative to the sleeve. These alignment steps enable an easy and quick replacement of a probe in a scan head. Thirdly, the guide rods engage corresponding guide bores to further ensure precise co-axial alignment of the probe with the probe receiver in the scan head during relative movement of the scan head and probe holder toward each other.

The non-rotatable base and the engageable guide posts and guide bores described above in conjunction with the probe holder may also be applied to a sample holder to ensure repeatable, precise positioning of the sample holder relative to the scan head to provide the same precise probe position on consecutive measurements on the same sample after the sample has been removed and reinserted into the microscope.

What is claimed is:

1. A scanning probe microscope comprising:

probe holder means for releasibly holding a probe;

a scan head; and the scan head and the probe holder means mounted for movement relative to each other to exchange a probe between the scan head and the probe holder means.

2. The microscope of claim 1 further comprising:

a base;

the probe holder means mounted on the base; and stationary scan head support means for mounting the scan head for movement toward and away from the base.

3. The microscope of claim 2 wherein the scan head support means comprises:

a stationarily mounted tubular sleeve having an open conically-shaped end;

means, mounted over the tubular sleeve and connected to the scan head, for bidirectionally moving the scan head relative to the probe holder means;

the scan head having a centrally located spindle projecting outward therefrom;

the spindle having an outer end surface shaped complementary to the conical end of the tubular sleeve to engage and co-axially center the spindle and the scan head within the conical end of the tubular sleeve.

4. The microscope of claim 3 further comprising:

at least one transverse extending arm formed on the spindle;

a sleeve mounted on the means for moving the scan head;

at least one aperture formed in the sleeve, edges of the sleeve surrounding the aperture having a ramp surface and an adjacent stop surface;

the arm on the spindle slidable along the ramp surface to engagement with the stop surface to rotate the scan head to a set rotational position.

5. The microscope of claim 4 further comprising:

a sample holder supporting a sample for scanning by the scan head; and means, mounted on the sample holder, for non-rotatingly mounting the sample holder in a guide support bracket fixed on the base.

6. The microscope of claim 5 wherein the non-rotatingly mounting means comprises:

the guide support bracket having an open-ended U-shaped slot; and a base affixed to the sample holder, the base having a shape prohibiting rotation of the base in the slot.

7. The microscope of claim 5 further comprising:

at least one bore formed in one of the scan head and the sample holder;

at least one guide rod mounted in and extending away from the other of the scan head and the sample holder;

the guide rod slidably engaging the bore as the scan head and sample holder are moved toward each other.

8. The microscope of claim 7 wherein:

the at least one guide rod is mounted on the sample holder; and the at least one bore is formed in the scan head.

9. The microscope of claim 7 wherein:

the at least one guide rod is mounted on the scan head; and the at least one bore is formed in the sample holder.

10. The microscope of claim 7 further comprising:

a plurality of circumferentially spaced bores; and a plurality of circumferentially spaced guide rods, each slidably engageable with one of the bores.

11. The microscope of claim 7 wherein:

the at least one bore includes a first smaller diameter end and a second larger diameter portion adjacent the first end;

the at least one guide rod having first and second end portions, the first end portion having a diameter engageable with the first diameter portion of the bore and a second larger diameter second end portion, disposed adjacent to the first end portion, engageable with the second diameter portion of the bore.

12. The microscope of claim 7 further comprising:

at least one additional bore spaced from the at least one bore, the additional bore having a diameter different than the diameter of the at least one bore;

at least one additional guide rod spaced from the at least one guide rod, the at least one additional guide rod having a diameter different than the diameter of the at least one guide rod and a length longer than a length of the at least one guide rod and engageable with the additional bore.

13. The microscope of claim 2 wherein the probe holder means comprises:

a body;

means, mounted on the body, for non-rotatingly mounting the body in a guide support bracket fixed on the base.

14. The microscope of claim 13 wherein the non-rotatingly mounting means comprises:

the guide support bracket having an open-ended U-shaped slot; and a base affixed to the body, the base having a shape prohibiting rotation of the base in the slot.

15. The microscope of claim 2 further comprising:

a plurality of circumferentially spaced bores formed in one of the scan head and the probe holder means;

a plurality of circumferentially spaced guide rods mounted in the other of the scan head and the probe holder means, each slidably engageable with one of the bores as the scan head and the probe holder means are moved toward each other;

the probe holder means including a body; and means, mounted on the body, for non-rotatingly mounting the body in a guide support bracket fixed on the base.

16. The microscope of claim 1 further comprising:

probe holder alignment means for co-axially and rotatingly aligning the probe holder means with the scan head.

17. The microscope of claim 16 wherein the alignment means comprises:

at least one bore formed in one of the scan head and the probe holder means;

at least one guide rod mounted in and extending away from the other of the scan head and the probe holder means;

the guide rod slidably engaging the bore as the scan head and probe transfer holder means are moved toward each other.

18. The microscope of claim 17 wherein:

the at least one guide rod is mounted on the probe holder means; and the at least one bore is formed in the scan head.

19. The microscope of claim 17 further comprising:

a plurality of circumferentially spaced bores; and a plurality of circumferentially spaced guide rods, each slidably engageable with one of the bores.

20. The microscope of claim 17 wherein:

the at least one bore includes a first smaller diameter end and a second larger diameter portion adjacent the first end;

the at least one guide rod having first and second end portions, the first end portion having a diameter engageable with the first diameter portion of the bore and a second larger diameter second end portion, disposed adjacent to the first end portion, engageable with the second diameter portion of the bore.

21. The microscope of claim 17 further comprising:

at least one additional bore spaced from the at least one bore, the additional bore having a diameter different than the diameter of the at least one bore;

at least one additional guide rod spaced from the at least one guide rod, the at least one additional guide rod having a diameter different than the diameter of the at least one guide rod and a length longer than a length of the at least one guide rod and engageable with the additional bore.

22. The microscope of claim 17 wherein:

the at least one guide rod is mounted on the scan head; and the at least one bore is formed in the probe holder means.

23. The microscope of claim 1 wherein the probe holder means comprises:

a body; and a probe transfer member mounted on the body and releasably receiving a probe.

24. The microscope of claim 23 further comprising:

a resilient member;

means for mounting the resilient member to the body; and an aperture formed centrally in the resilient member for receiving the probe transfer member.

25. The microscope of claim 23 further comprising:

means for releasably locking the probe in the probe transfer member.

26. The microscope of claim 25 wherein the locking means comprises:

a lock member fixed at one end to the body and extending to a movable second end disposed on an opposite side of the body;

aligned notches formed in the probe transfer member and the probe and engaged by the lock member when the lock member is in a lock position to releasably lock the probe in the probe transfer member.

27. A scanning probe microscope comprising:

a scan head;

a base;

sample holder means, mounted on the base, for supporting a sample for scanning by the scan head; and sample holder alignment means for co-axially and rotatingly aligning the sample holder means with the scan head, the alignment means including:

means for non-rotatingly mounting the sample holder means on the base;

at least one bore formed in one of the scan head and the sample holder means;

at least one guide rod mounted in and extending away from the other of the scan head and the sample holder means;

the guide rod slidably engaging the bore as the scan head and the sample holder means are moved toward each other.

28. The microscope of claim 27 wherein the non-rotatably mounting means comprises:

a guide support bracket fixed on the base and having an open-ended U-shaped slot; and a base affixed to the sample holder means, the base having a shape prohibiting rotation of the base in the slot.

29. The microscope of claim 27 wherein:

the at least one guide rod is mounted on the sample holder means; and the at least one bore is formed in the scan head.

30. The microscope of claim 27 further comprising:

the at least one guide rod is mounted on the scan head; and the at least one bore is formed in the sample holder means.

31. A scanning probe microscope comprising:

a scan head;

a base;

stationary scan head support means for mounting the scan head for movement toward and away from the base;

sample holder means, mounted on the base, for supporting a sample for scanning by the scan head;

a stationarily mounted tubular sleeve having an open conically-shaped end;

means, mounted over the tubular sleeve and connected to the scan head, for bidirectionally moving the scan head relative to the sample holder means;

the scan head having a centrally located spindle projecting outward therefrom; and the spindle having an outer end surface shaped complementary to the conical end of the tubular sleeve to engage and co-axially center the spindle and the scan head within the conical end of the tubular sleeve.

32. The microscope of claim 31 further comprising:

at least one transverse extending arm formed on the spindle;

a sleeve mounted on the means for moving the scan head;

at least one aperture formed in the sleeve, edges of the sleeve surrounding the aperture having a ramp surface and an adjacent stop surface;

the arm on the spindle slidable along the ramp surface to engagement with the stop surface to rotate the scan head to a set rotational position.

33. A method of replacing a probe in a scanning probe microscope having a probe receiver mounted in a scan head, the method comprising the steps of:

mounting a probe holder in a support;

effecting relative movement of the scan head and probe holder toward each other to exchange a probe between the scan head and the probe holder.

34. The method of claim 33 further comprising the step of co-axially aligning the scan head and the probe holder.

35. The method of claim 34 wherein the aligning step further comprises the steps of:

stationarily mounting a tubular sleeve having a flared conical end;

movably mounting a scan head support to the tubular sleeve; and mounting an axially extending spindle having an end surface shaped complementary to the conical end of the tubular sleeve on the scan head to axially center the spindle in the tubular sleeve when the spindle engages the conical end of the tubular sleeve.

36. The method of claim 35 further comprising the steps of:

forming at least one transverse extending arm formed on the spindle; and providing another sleeve on the scan head support; and forming at least one aperture in the another sleeve with edges of the another sleeve surrounding the aperture having a ramp surface and an adjacent stop surface;

the arm on the spindle slidable along the ramp surface to engagement with the stop surface to rotate the scan head to a set rotational position.

37. The method of claim 34 where the aligning step further comprises the steps of:

forming at least one bore in one of the scan head and the probe holder; and mounting at least one guide rod in one of the scan head and the probe holder such that the guide rod engages the bore when the scan head and probe holder are moved toward each other.

38. The method of claim 37 further comprising the step of:

forming the bore and the guide rod of a smaller diameter than an additional bore and an additional guide rod;

forming the additional guide rod of a longer length than the guide rod so as to engage the additional bore before the guide rod engages the bore.

39. The method of claim 37 further comprising the steps of:

forming the bore with a first larger diameter end and a second smaller diameter inner portion; and forming the guide rod with a larger diameter first end portion engageable with the first diameter portion of the bore and a smaller diameter second end portion engageable with the second diameter portion of the bore.

40. The method of claim 34 wherein the aligning step further comprises the steps of:

non-rotatingly mounting the probe holder in the mounting support.

41. The method of claim 34 comprising the step of:

replacing the probe holder with a sample holder.

42. The method of claim 33 further comprising the steps of:

forming the probe holder of a body and a probe transfer member mounted in the body and releasibly receiving a probe.

43. The method of claim 42 further comprising the step of:

releasibly locking the probe in the probe transfer member.

44. A method of aligning a sample holder with a scan head in a scanning probe microscope, the method comprising the steps of:

stationarily mounting a tubular sleeve having a flared conical end;

movably mounting a scan head support to the tubular sleeve; and mounting an axially extending spindle having an end surface shaped complementary to the conical end of the tubular sleeve on the scan head to axially center the spindle in the tubular sleeve when the spindle engages the conical end of the tubular sleeve.

45. The method of claim 44 further comprising the steps of:

forming at least one transverse extending arm formed on the spindle;

providing another sleeve on the scan head support; and forming at least one aperture in the another sleeve with edges of the another sleeve surrounding the aperture having a ramp surface and an adjacent stop surface;

the arm on the spindle slidable along the ramp surface to engagement with the stop surface to rotate the scan head to a set rotational position.

46. The method of claim 44 further comprising the steps of:

forming at least one bore in one of the scan head and the sample holder; and mounting at least one guide rod in one of the scan head and the sample holder such that the guide rod engages the bore when the scan head and sample holder are moved toward each other.

47. The method of claim 46 further comprising the step of:

forming the bore and the guide rod of a smaller diameter than an additional bore and an additional guide rod;

forming the additional guide rod of a longer length than the guide rod so as to engage the additional bore before the guide rod engages the bore.

48. The method of claim 46 further comprising the steps of:

forming the bore with a first larger diameter end and a second smaller diameter inner portion; and forming the guide rod with a larger diameter first end portion engageable with the first diameter portion of the bore and a smaller diameter second end portion engageable with the second diameter portion of the bore.

49. The method of claim 44 further comprising the step of:

non-rotatingly mounting the sample holder in the mounting support.

50. A method for aligning a sample holder with a scan head in a scanning probe microscope, the method comprising the steps of:

co-axially and rotatingly aligning the sample holder with a scan head;

non-rotatably mounting the sample holder on the base; and providing at least one interengaging bore and at least one guide rod in the sample holder and the scan head for engagement when the scan head and the sample holder are moved toward each other.

51. The method of claim 50 wherein the step of non-rotatingly mounting the sample holder on the base comprises the steps of:

fixing a guide support bracket having an open-ended U-shaped slot on the base;

forming at least a portion of the sample holder with a shape which prohibits rotation of the sample holder in the U-shaped slot; and non-rotatingly mounting the sample holder in the U-shaped slot in the guide support bracket.

* * * * *